United States Patent
Janssen et al.

(10) Patent No.: US 7,853,706 B2
(45) Date of Patent: Dec. 14, 2010

(54) METHOD, INTERFACE AND NETWORK FOR CYCLICAL SENDING OF ETHERNET TELEGRAMS

(75) Inventors: Dirk Janssen, Verl (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 1189 days.

(21) Appl. No.: 10/564,962

(22) PCT Filed: Dec. 30, 2004

(86) PCT No.: PCT/EP2004/014832
§ 371 (c)(1),
(2), (4) Date: Jul. 12, 2006

(87) PCT Pub. No.: WO2005/066728
PCT Pub. Date: Jul. 21, 2005

(65) Prior Publication Data
US 2007/0076243 A1    Apr. 5, 2007

(30) Foreign Application Priority Data
Jan. 9, 2004    (DE) .................... 10 2004 001 435

(51) Int. Cl.
*G06F 15/16* (2006.01)
(52) U.S. Cl. ...................... 709/230; 709/231
(58) Field of Classification Search ............ None
See application file for complete search history.

(56) References Cited

U.S. PATENT DOCUMENTS

| | | | |
|---|---|---|---|
| 5,559,796 A * | 9/1996 | Edem et al. ........... | 370/412 |
| 6,381,647 B1 * | 4/2002 | Darnell et al. ......... | 709/232 |
| 6,757,725 B1 * | 6/2004 | Frantz et al. .......... | 709/250 |
| 7,002,941 B1 * | 2/2006 | Treadaway et al. ..... | 370/338 |
| 2002/0136225 A1 * | 9/2002 | Joy et al. ............. | 370/401 |
| 2003/0161307 A1 * | 8/2003 | Lo .................... | 370/389 |
| 2004/0141517 A1 * | 7/2004 | Balasubramanian et al. | 370/462 |
| 2004/0156390 A1 * | 8/2004 | Prasad et al. ......... | 370/466 |
| 2004/0218619 A1 * | 11/2004 | Salo ................... | 370/442 |

FOREIGN PATENT DOCUMENTS

EP    1 026 599 A2    8/2000

(Continued)

OTHER PUBLICATIONS

Venkatramani, Chitra et al., *Design, Implementation, and Evaluation of a Software-based Real-Time Ethernet Protocol*, Computer Communication Review Association For Computing Machinery, Oct. 10, 1995, pp. 27-37, vol. 25-No. 4, New York.

(Continued)

*Primary Examiner*—Hassan Phillips
(74) *Attorney, Agent, or Firm*—Faegre & Benson LLP

(57) ABSTRACT

When data are sent in the form of Ethernet messages on an Ethernet transmission link using an interface to link a node to the Ethernet transmission link, the data to be sent are converted using a conversion unit in line with a transmission standard of the Ethernet protocol in order to provide Ethernet messages, and a transmission unit is used for ongoing transmission of the provided Ethernet messages, with Ethernet messages being output onto the Ethernet transmission link continuously.

21 Claims, 3 Drawing Sheets

FOREIGN PATENT DOCUMENTS

| | | |
|---|---|---|
| JP | 4355325 | 12/1992 |
| JP | 2000-098427 | 4/2000 |
| JP | 2003-244200 | 8/2003 |

OTHER PUBLICATIONS

Beckhoff Industrie Elektronik: *Real-time Ethernet: Ultra high speed right up to the I/O*, PC Control, Online, Year. 2003, vol. 2, Jun. 2003, http://www.pc-control.net/pdf/022003/pcc_0203_d.pdf>.

Vonnahme, Erik et al., *Measurements in Switched Ethernet Networks Used for Automation Systems*, Factory Communication Systems, 2000 Proceedings. 2000 IEEE International Workshop in Porto, Portugal Sep. 6-8, 2000, Piscataway, NJ, US.

Hutchison, D. et al., *Ethernet for Real-time applications*, IEE Proceedings-Section E, No. 1, Part E, Jan. 1987, pp. 47-53, Institution of Electrical Engineers, Stevenage, Great Britain.

Mandeville, Bob, *Benchmarking Methodology for Ethernet Switches*, Benchmarking Methodology Working Group Internet Draft, Dec. 1995, pp. 1-14, Wandel & Goltermann Technologies, Inc., <draft-ietf-bmwg-ethernet-switches-00.txt>.

* cited by examiner

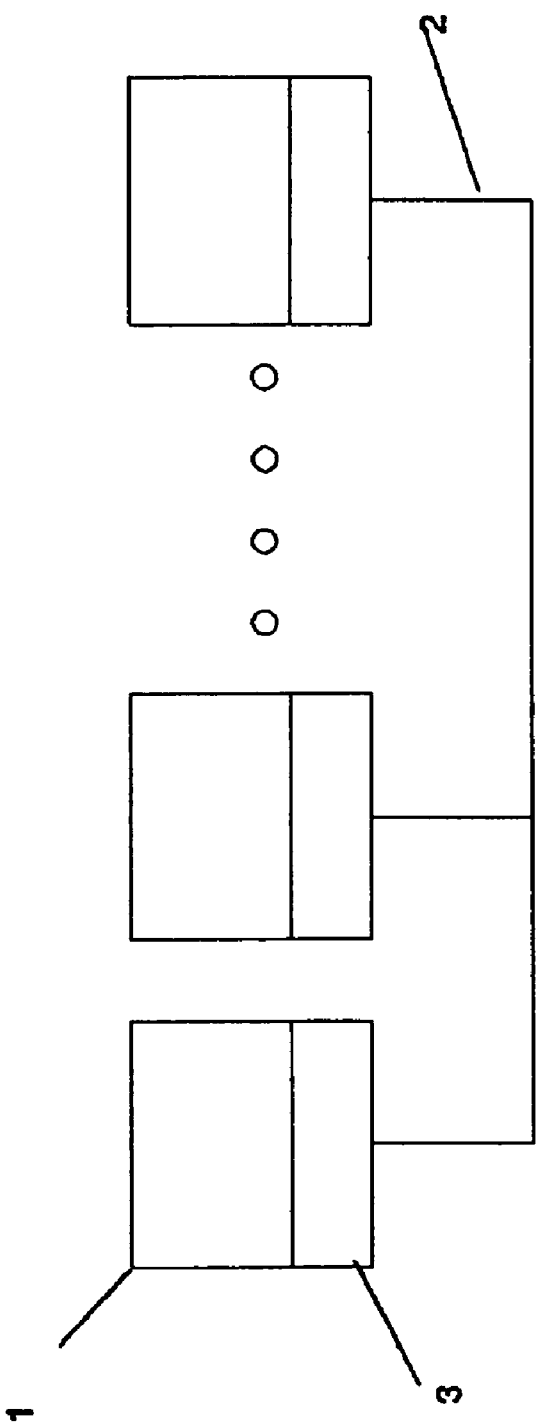

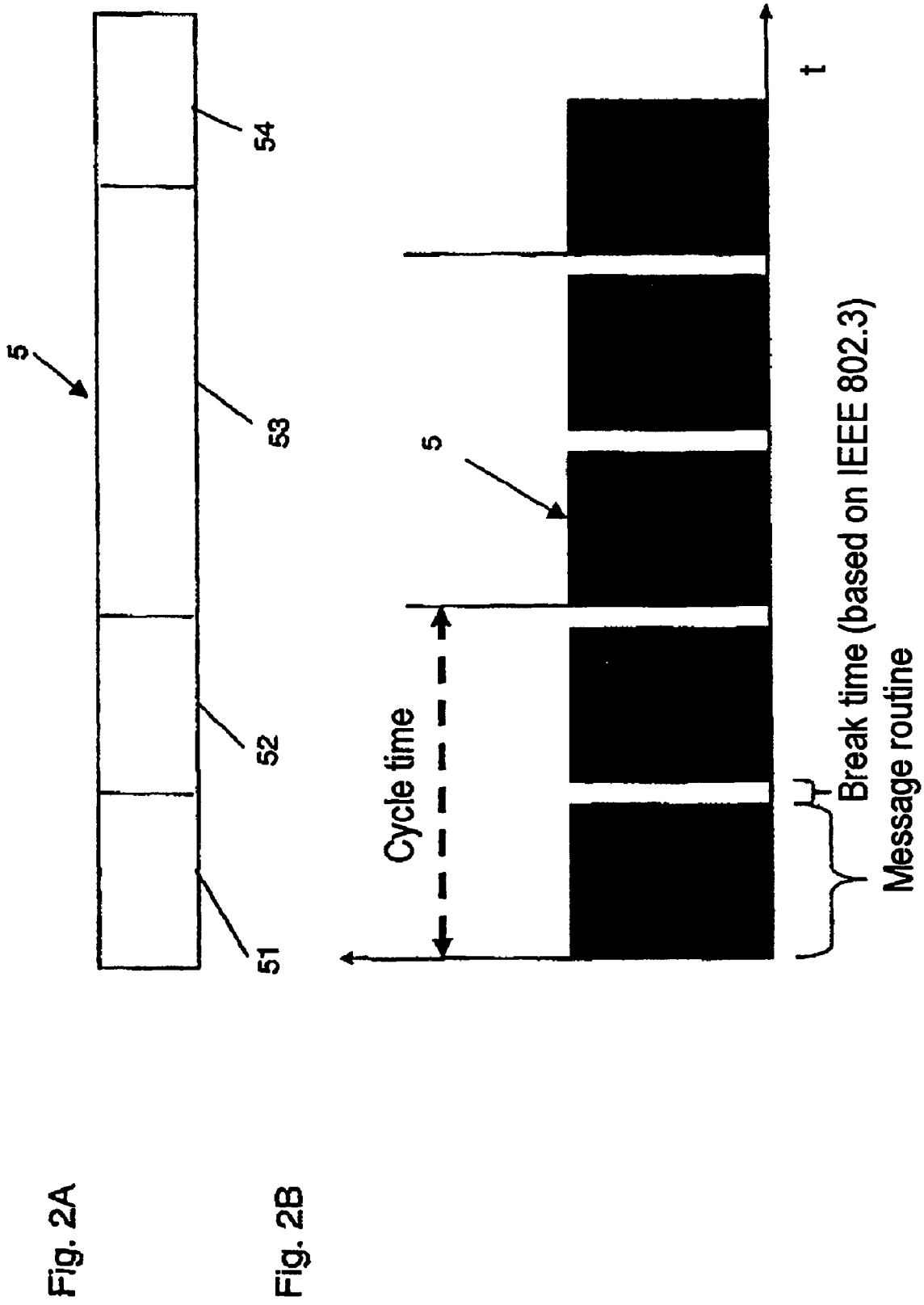

METHOD, INTERFACE AND NETWORK FOR CYCLICAL SENDING OF ETHERNET TELEGRAMS

This application is the national phase under 35 U.S.C. §371 of PCT International Application No. PCT/EP2004/014382, which has an international filing date of Dec. 30, 2004, and which claims priority to German patent application number GE102004001435 filed Jan. 9, 2004.

FIELD OF THE INVENTION

The invention relates to a method, an interface and a network for cyclically sending Ethernet messages.

BACKGROUND OF THE INVENTION

The Ethernet is the most widespread technology for transmitting data in local area communication networks, "local area networks" (LAN), currently at a speed of up to 100 million bits/s (mbps). LANs are local area communication networks which are limited to a geographical area and are made up of one of a plurality of servers and workstations, "nodes", which are connected by means of a transmission link, e.g. a coaxial, fibreglass or twisted pair cable. A wide variety of network topologies are possible for LANS, with the best known being the bus, ring, star or tree structures.

LANs are operated with a network operating system and a standard network protocol. The Ethernet is one possible network protocol and in this case supports a wide variety of communication protocols, e.g. the TCP/IP protocol or the IPX protocol. In the OSI layer model, the international reference model for data transmission in networks, which is constructed from a layer stack comprising seven layers, each layer having a set of protocols defined for it which each provide their services to the next highest layer, the Ethernet is associated with the second layer, the "data link layer". This data link layer converges the data which are to be sent to form messages, which have specific information added to them for the respective communication protocol. The data link layer has responsibility in the network for transporting the data messages from node to node and for error detection.

In the case of the Ethernet concept, the data link layer is divided into two levels, with the first level adding a header section, a "start identifier", to the data, said header section containing information which is required by the receiver protocol for correct data transmission. In the second level of the Ethernet protocol, the data message is then encapsulated using an additional preamble and an end section, a "checksum", for transport from node to node. Using such Ethernet messages, it is possible to transmit data with a length of up to 1500 bytes, it being necessary to observe a fixed break time between the individual Ethernet messages.

The responsibility for sending and receiving the Ethernet messages on the Ethernet transmission link is that of an Ethernet controller, also called a media access controller (MAC), which is switched between the node and the Ethernet transmission link and is connected to the node via a bus system. This Ethernet controller is normally controlled by a software driver, which is incorporated in the respective operating system of the node. The Ethernet controller generally comprises a send shift register and a receive shift register in order to decouple the Ethernet transmission link from the physical memory of the node. Modern Ethernet controllers also normally have an opportunity for direct access to the physical memory of the node, "direct memory access" (DMA), as a result of which the software driver in the operating system of the node can store the Ethernet messages to be sent and received directly in the memory of the node or fetch them from this memory with a time saving.

Ethernet protocols are primarily used in office communication networks. The advantages of the Ethernet concept when using standard hardware and software components and also the opportunity to achieve high data transmission rates with simple networking technology mean that Ethernet communication networks increasingly also need to be used in industrial production for data interchange between workstations. When using the Ethernet protocol in automation technology, however, additional complex hardware and/or software techniques need to be used to ensure the real-time capability of Ethernet data transmission. When controlling machines, it is normally necessary for cyclic processing of a control task to take place essentially without any time fluctuations, i.e. "jitter", the reaction to the control request having a predictable response time.

If Ethernet messages are to be sent cyclically, for example as part of a real-time application running on a control computer designed as a node in an Ethernet network, in order to address sensors and actuators linked by means of the Ethernet transmission link, the control computer uses the software driver integrated in the operating system to send appropriate Ethernet messages to its Ethernet controller in each control cycle. In this case, the software driver automatically adds the break times, start identifiers, preambles and checksums defined in the Ethernet transmission standard (IEEE 802.3) to the real-time data which are to be sent before transferring the Ethernet messages to the Ethernet controller. The Ethernet controller then loads the corresponding Ethernet messages into its send shift register, preferably using direct memory access transmission, and starts to send the Ethernet messages on the Ethernet transmission link from a particular filling level of the send shift register onward.

This send sequence of the control computer with the connected Ethernet controller contains a plurality of jitter-affected operations whose jitters add up in the worst case and then exceed a maximum permissible value for the real-time application, which is normally in the range of a few microseconds. In this case, the jitter is supported by the fluctuating interrupt latencies at the node when generating the data which are to be sent, and by the routine fluctuations in the program code processed up to the sending of the Ethernet message. In modern control computers, which have a cache memory, the routine of the program codes additionally fluctuates too, since depending on the cache content it is necessary to wait a different length of time for the requested content of the memory at the node.

The Ethernet controller is normally connected to the node by means of a bus system, with a PCI bus often being used. Since such a bus is generally also used by other system parts, different lengths of waiting times may arise for the bus allocation. This applies both when the Ethernet controller accesses the physical memory of the control computer using direct memory access transmission and when the real-time data are transmitted via the bus system under the control of the software driver. Similar jitters always arise during bus allocation. Furthermore, the Ethernet controller always starts to send the Ethernet messages on the Ethernet transmission link from a particular filling level of the send shift register onward. In this case, the sending of the Ethernet messages may then be delayed for different lengths of time depending on the filling level of the send shift register, which results in additional jitter.

If the resultant total jitter in the transmission operation is above the maximum permissible jitter for the respective real-time applications, such a discrepancy a complex method, such as IEEE 1588 (IEEE Standard for a Precision Clock Synchronization Protocol for Networked Measurement and Control Systems), needs to be used to provide an appropriately accurate time base in all communication subscribers on the Ethernet transmission link, which can then be used to compensate for the jitter.

SUMMARY OF THE INVENTION

It is an object of the invention to provide a method for sending data in the form of Ethernet messages on an Ethernet transmission link, an interface for linking a node to an Ethernet transmission link and an Ethernet network which are able to be used in a simple manner to send Ethernet messages, particularly containing real-time data, without jitter and cyclically.

In line with the invention, to send data in the form of Ethernet messages on an Ethernet transmission link using an interface for linking a node to the Ethernet transmission link, the data to be sent are converted using a conversion unit in line with a transmission standard of the Ethernet protocol, in order to provide Ethernet messages, and a transmission unit is then used for ongoing transmission of the provided Ethernet messages, with continuous Ethernet messages being output onto the Ethernet transmission link.

The inventive continuous transmission of Ethernet messages allows exact repeatability of the transmission operation and hence jitter-free sending of the Ethernet messages. The fact that the interface for linking the node to the Ethernet sends the next Ethernet message directly after an Ethernet message which has been sent ensures that all jitter-affected operations in the transmission sequence from conversion of the data which are to be sent into Ethernet messages up to output of the messages onto the Ethernet transmission link are compensated for. This is because the timing of the transmission operation is determined exclusively by the interface of the node to the Ethernet, with the continuous transmission of the messages ensuring that the latter are completely free of jitter.

In line with one preferred embodiment of the invention, for ongoing transmission of the provided Ethernet messages the length of the cycle time is adapted, for a prescribed length of the Ethernet messages, within the framework of the maximum permissible duration of the cycle in order to output Ethernet messages onto the Ethernet transmission link continuously during the entire cycle time. This practice ensures a continuous transmission operation for the Ethernet messages within the framework of a prescribed maximum transmission cycle duration while simultaneously optimizing use of the cycle length, with the jitter which occurs during the generation of the Ethernet messages being cleared completely.

In line with a further preferred embodiment of the invention, upon ongoing transmission of the Ethernet messages using the interface the number and/or the length of the Ethernet messages which are to be sent in a cycle is adapted to a prescribed cycle time such that Ethernet messages can be output onto the Ethernet transmission link continuously during the entire prescribed cycle time. This practice allows a continuous transmission operation for the Ethernet messages within the framework of a transmission cycle while simultaneously optimizing use of the data length which is possible in the cycle, with the jitter which arises during generation of the Ethernet messages being cleared completely.

In line with a further preferred embodiment, adaptation of the Ethernet messages takes account of the baud rate of the Ethernet transmission link, the length of the start identifier, preamble and checksum inserted into the respective Ethernet message during conversion of the data in line with the transmission standard from the Ethernet protocol, and the length of the break times which are to be observed between the Ethernet messages which are to be sent. This practice provides a simple way of determining the optimum length of the Ethernet messages which are to be sent continuously on the Ethernet transmission link. A further preference in this case is for account to be taken of the fact that if the calculated length of the Ethernet message is greater than the maximum possible length of the Ethernet message then the number and length of the Ethernet messages to be sent is chosen such that in one cycle a plurality of Ethernet messages, which are preferably of the same length, are sent whose total bit length corresponds to the cycle time. This ensures that it is a simple matter to determine an optimum length for the Ethernet messages which are to be sent.

In line with a further preferred embodiment, the provided Ethernet messages are stored in a buffer store, with the interface starting the transmission operation on the basis of a prescribed filling level in the buffer store. This practice ensures that there are always sufficient Ethernet messages to be sent in the interface in order to ensure a continuous transmission operation. This prevents the transmission operation from idling and there being resultant message delays which would then result in infringement of the cycle.

Another provision of the invention is that if the data are real-time data then a real-time application generating the real-time data which are to be sent is synchronized at the node to the transmission operation for the Ethernet messages. This practice prevents Ethernet messages from overflowing in the interface during the transmission operation, which would result in the Ethernet messages no longer being able to be sent quickly enough. The fact that the real-time application running at the node is tuned to the time base of the interface executing the transmission operation ensures that the node delivers Ethernet messages only in tune with the transmission operation of the interface, and thus there is no overflow of Ethernet messages.

In line with a further preferred embodiment, the Ethernet network with the Ethernet transmission link, to which a plurality of nodes are linked is designed such that the Ethernet messages can be transmitted on the transmission channel without collision. This ensures that transmission on the Ethernet can be continuous without the transmission operation being interrupted on account of collisions on the transmission link and hence there being an infringement of the cycle.

Another preference in this case is that the Ethernet transmission link has a ring-shaped topological arrangement, with the Ethernet messages sent by the transmission node being forwarded from one node to the next. This practice allows collision-free transmission of the Ethernet messages with little delay from one node to the next.

BRIEF DESCRIPTION OF THE DRAWINGS

The invention is explained in more detail with reference to the appended drawings, in which:
FIG. 1A shows an Ethernet network;
FIG. 2A shows an Ethernet message,
and
 FIG. 2B shows an inventive transmission operation.

DETAILED DESCRIPTION OF THE INVENTION

Figure 1B:
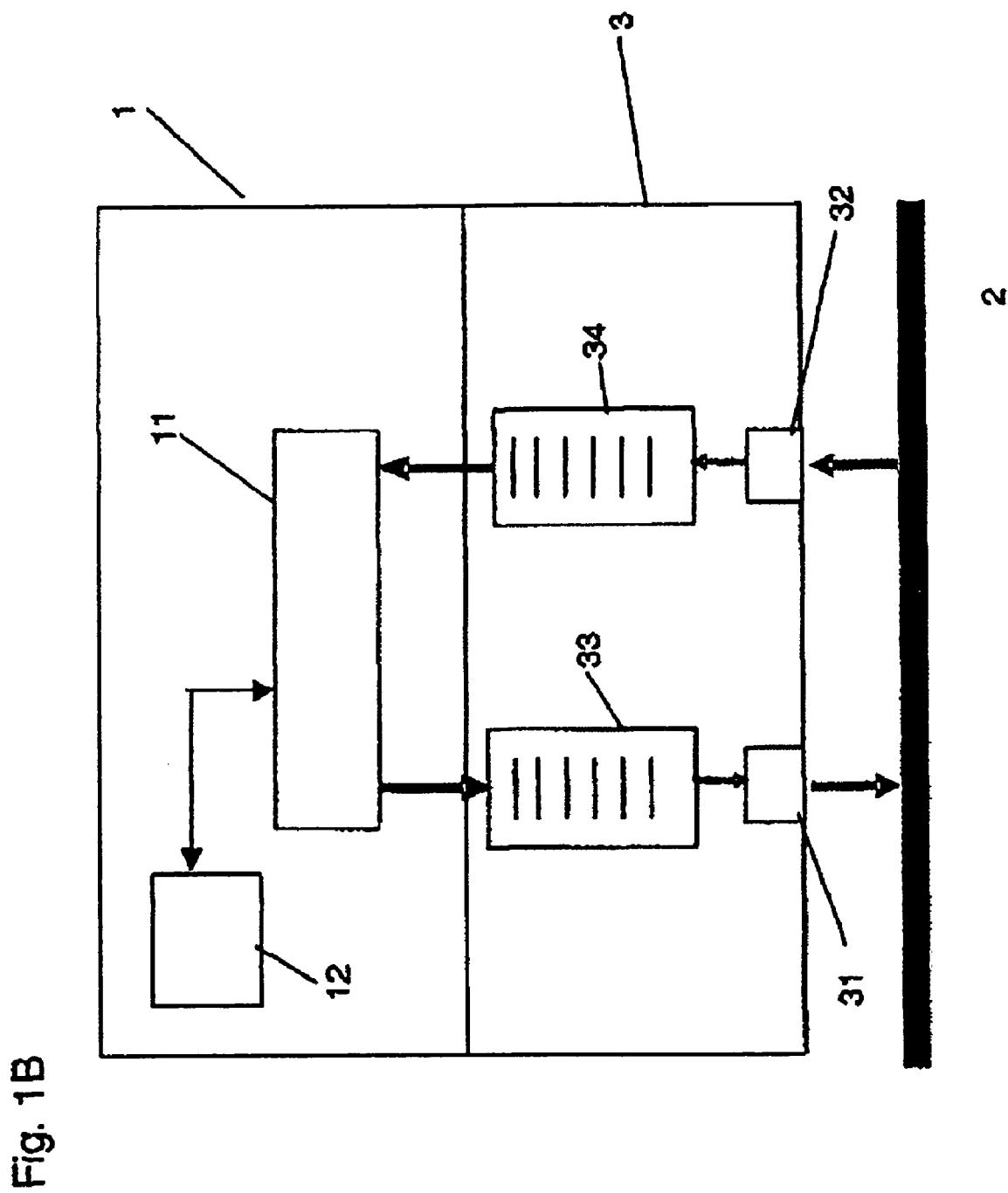
FIG. 1B shows an inventive design for a node connection in the Ethernet network.

The Ethernet concept is the most widespread communication standard in locally restricted communication networks (LAN) which allow joint use of data resources between workstations, in general terms computers or machines, subsequently also called nodes, in a simple manner. In this context, the Ethernet is based on a LAN design, in which a plurality of nodes are connected to one another by means of a common transmission medium, with the Ethernet concept encapsulating the data which are to be transmitted in data packets, subsequently also called Ethernet messages, with a predetermined format. In this case, the Ethernet comprises three areas, namely the transmission link and the network interfaces, that is to say the hardware, the set of protocols which control access to the Ethernet transmission link, and the Ethernet message format.

FIG. 1A schematically shows an Ethernet network in which a plurality of nodes 1 are connected to one another via an Ethernet transmission link 2. In this arrangement, the node is linked to the Ethernet transmission link using an Ethernet controller 3, which is preferably integrated in the associated nodes. An inventive node 1 with a connected Ethernet controller 3 for linking to the Ethernet transmission link 2 is shown in detail in FIG. 1B. The responsibility for sending the Ethernet messages in the Ethernet controller is that of a coding unit 31, and that for receiving the Ethernet messages from the transmission link 2 is that of a decoder unit 32. The coding unit 31 and the decoding unit 32 have a respective buffer store 33, 34, which is in the form of a shift register, connected to them for the purpose of buffer-storing the Ethernet messages which are to be sent and received. These send and receive shift registers 33, 34 in turn are preferably designed such that they can access a physical memory 11 at the node 1 directly using the "direct memory access" (DMA) mode. Alternatively, it is possible for the data interchange to take place between the send shift memory 33 or the received shift memory 34 and the physical memory 11 via a central processing unit (CPU) 12 at the node 1. Direct access using the DMA mode allows faster data interchange, however.

The data interchange between the physical memory 11 at the node 1 and the interface 2 is normally controlled by the CPU 12 at the node 1. In addition, the CPU 12 at the node also manages all operations which are required for operating the Ethernet, i.e. manages the send and receive operation and ensures encapsulation of the data which are to be sent from the node into Ethernet messages and the unpacking of the data from the received Ethernet messages. The operating system implemented on the CPU 12 of the node 1 normally has a layered software structure in order to separate protocol-specific processing from message-specific and hardware-specific processing. This makes it possible to use different communication protocols in the Ethernet standard without having to make changes to the hardware-specific driver. At the same time, it is then also possible to change the hardware of the node without simultaneously having to make a protocol-specific software change.

An Ethernet message 5, whose structure is shown schematically in FIG. 2A, can contain up to 1500 bytes and is made up of a header portion with a start identifier 51, a preamble 52, which identifies the destination and source addresses and the data packet type, a central portion 53 containing data, and an end portion 54 which contains a checksum and is used as an error identification mechanism.

A transmission operation for Ethernet messages using the Ethernet transmission link 2 is executed such that the software driver used in the CPU 12 converts the data which are to be sent into Ethernet messages which, when the Ethernet controller 3 is operating in DMA mode, are stored in the physical memory 11 at the node 1. These stored Ethernet messages are then accessed by the send shift register 33 of the Ethernet controller 3 in order to load the Ethernet messages into the shift register. If sufficient Ethernet messages have been transferred from the physical memory 11 to the send shift register 33 under the control of the software driver in the CPU 12, and hence a sufficient filling level has been reached, the send shift register 33 outputs the buffer-stored Ethernet messages onto the Ethernet transmission link 2 via the coding unit 31. In this case, Ethernet data transmission takes place only when the Ethernet network is at rest. In addition, there is normally also a collision prevention mechanism on the Ethernet transmission link 2.

When Ethernet messages are received, the received Ethernet messages are buffer-stored in the receive shift register 34 by the decoding unit 32, with the Ethernet controller 3 initiating an interrupt at the node 1. This interrupt prompts the software driver in the CPU 12 at the node 1 to transfer the received messages to the physical memory 11 using the DMA mode and then to forward them to the operating system at the node for processing.

The Ethernet concept is used as a communication protocol for network systems particularly because standard hardware and software components can be used and in addition a high data transmission rate is possible. When the Ethernet standard is used in an industrial environment, particularly for automation tasks, the Ethernet protocol needs to ensure real-time data transmission, however. To be able to execute a real-time application, such as a machine controller, reliably using an Ethernet network, data interchange with cycle times of 50 μsec and admissible jitter times, i.e. deviations from the desired cycle time, of 10 μsec is required.

If a control computer, which is a node 1 in an Ethernet network, needs to control sensors or actuators linked as further nodes to the Ethernet transmission link 2 in real time, then in each control cycle the control computer uses the software driver stored in its CPU 12 to transfer Ethernet messages 5 to the associated Ethernet controller 3 for sending. The Ethernet controller 3 will then load the corresponding Ethernet messages 5, preferably using DMA mode, into its send shift register 33 and, from a particular filling level in this send register onward, will start to send the Ethernet messages on the Ethernet transmission link 2.

However, this transmission sequence contains a plurality of jitter-affected operations whose jitter adds up in the worst case. A first jitter results merely from the fluctuating interrupt latencies of the operating system of the control computer and of the software driver when converting the Ethernet messages. In addition, routine fluctuations in the data code which passes through up to the sending of the Ethernet messages arise. In modern control computers, which have a cache memory, the runtimes of one and the same passing data code also fluctuate in addition, since it is necessary to wait different lengths of time for the requested memory, depending on the cache content. Further jitter also arises when transferring the Ethernet messages to the Ethernet controller. The Ethernet controller is linked to the control computer by means of a bus system, e.g. a PCI bus. Since the bus is also used by other system parts of the control computer, waiting times of different length may arise during bus allocation when the Ethernet controller accesses the physical memory to transfer the Ethernet messages to the send shift register. Even when the Ethernet controller is not operating using DMA transmission mode, but rather the data are transmitted to the send shift register of the Ethernet controller from the physical memory by means of the CPU, similar jitter arises during bus allocation. In addition, the transmission of the Ethernet messages is delayed for different lengths of time depending on the filling level of the send shift register. If all of said jitter-affected operations add up, there is the risk that the resultant total jitter will be greater than the jitter which is permissible for the respective real-time application, and real-time control will then no longer be ensured.

So as not, as conventionally, to have to carry out complex methods for bringing the time base into line between the individual nodes and hence for compensating for the communication jitter, the invention involves the Ethernet controller 3 being programmed using the software driver on the CPU 12 at the computer node 1 such that Ethernet messages 5 are sent from the send shift register 33 without a break. In this case, the send shift register 33 and the connected coding unit 31 of the Ethernet controller 3 are controlled such that directly after an Ethernet message which has been sent the next Ethernet message is sent, observing the break time defined in the Ethernet transmission standard.

To ensure that Ethernet messages are sent continuously during a prescribed cycle time in the real-time application which is to be executed, the software driver in the CPU 12 calculates how many and what length of Ethernet messages need to be sent in order to observe the prescribed cycle time exactly. The software driver compiles the data 53 which are to be sent into Ethernet messages 5 of appropriate length with a start identifier 51, a preamble 52 and a checksum 54, in line with the Ethernet transmission standard, and stores them in the physical memory 11 at the node 1. The send shift register 33 in the Ethernet controller 3 then accesses these Ethernet messages 5 and buffer-stores them. From a certain filling level in the send shift register 33 onward, the transmission operation is then started, with Ethernet messages being sent continuously, as shown in FIG. 2B. In this case, a transmission operation is shown in which two messages of the same length are sent within a prescribed cycle time, observing the stipulated break time.

Using the send shift register 33 integrated in the Ethernet controller 3, the provision of the Ethernet messages by the software driver in the CPU 13 in the physical memory 11 at the node 1 is decoupled from the transmission time for these Ethernet messages, so that the jitter arising for the real-time application and the jitter arising when the Ethernet messages are transferred to the Ethernet controller 3 are compensated for. Since the timing of the transmission operation is dependent exclusively on the Ethernet controller 3 and on the downstream transmission physics of the Ethernet transmission link 2, and the Ethernet controller sends Ethernet messages 5 continuously from its send shift register 33, exact repeatability and hence jitter-free transmission are possible.

To allow continuous sending of the Ethernet messages, the real-time application is synchronized at the node to the Ethernet controller 3 using the software driver in the CPU 12. The Ethernet controller 3 defines the time base to which the real-time application is synchronized on the control computer 1. This ensures that the software driver in the CPU 12 will always transfer sufficient Ethernet messages for transmission to the Ethernet controller 3 in order to prevent the send shift register 33 in the Ethernet controller 3 from idling, and thus message delays from arising which would result in an infringement of the cycle time. In addition, the synchronization of the real-time application at the node 1 to the time base of the Ethernet controller 3 ensures that not too many Ethernet messages are transferred to the Ethernet controller 3 and hence that the send shift register 33 does not overflow and the Ethernet messages can no longer be sent quickly enough.

When calculating the number and length of Ethernet messages to be sent in one cycle of the real-time application, the software driver in the CPU 12 at the node 1 takes into account both the baud rate used on the Ethernet transmission link 2 and the additional data which are automatically inserted upon encapsulation of the data which are to be sent, i.e. start identifier 51, preamble 52 and checksum 54, and also the break times which are to be observed between the Ethernet messages. These additional signals are defined in the Ethernet standard IEEE 802.3 and, in the case of a 100-Base-TX Ethernet, that is to say a fast Ethernet at 100 Mbaud, are 8 bits for the start identifier, 56 bits for the preamble, 32 bits for the checksum and 69 bits for the break time.

If it is now necessary to achieve a cycle time for the real-time application of x μsec, the following formula applies: (L is the maximum bit length of the Ethernet message)

$$L=(x\cdot 100)-(8+56+32+69)$$

For a cycle time of 100 μsec, the following it then obtained:

$$L=9808 \text{ bits}=1226 \text{ bytes}.$$

The software driver in the CPU 12 at the node 1 can thus send one or more messages of the same length with a total length including the break times of 1226 bytes in a cycle time of 100 μsec. If two messages are sent, for example, then the byte length is 613 bytes per message (including break time). Splitting into a plurality of messages is absolutely essential if the message length obtained for a cycle time is greater than the maximum Ethernet messages of 1500 bytes. It is then always necessary to send a plurality of Ethernet messages as appropriate to use the full cycle time. If a cycle time of 500 μsec is prescribed, for example, then five messages each containing 1226 bytes (100 μsec) can be sent.

As an alternative to prescribing a cycle time, it is also possible to achieve continuous sending of Ethernet messages by prescribing the length of the Ethernet messages which are to be sent so as then to derive the necessary cycle time therefrom. In this case, the software driver in the CPU calculates the optimum cycle time ensuring continuous sending of the Ethernet messages from the prescribed length of the Ethernet messages and from the maximum permissible duration of the control cycle, in order to be able to execute a real-time application, such as a machine controller, using the Ethernet network. The software driver then in turn compiles the data for transmission into Ethernet messages of appropriate length containing a start identifier 51, a preamble 52 and a checksum 54, in line with the Ethernet transmission standard, and stores them in the physical memory 11 at the node 1. The send shift register 33 of the Ethernet controller 3 then accesses these Ethernet messages 5 and buffer-stores them. From a certain filling level in the shift register 33 onward, the transmission operation is then started, with Ethernet messages being sent continuously within the calculated cycle time, observing the stipulated break time.

In the case of the inventive transmission operation, in which transmission takes place more or less continuously, it is also necessary to ensure that no collisions occur on the transmission channel, since in that case the Ethernet controller has to interrupt the transmission and start it again only later. In this case, a suitable topology for the Ethernet network for a collision-free transmission operation is a peer-to-peer connection between the nodes. It is also possible to actuate a plurality of subscribers using a switch which prevents collisions. A ring-shaped network topology for a plurality of nodes is also possible, in which case the Ethernet messages can be forwarded from node to node and then returned to the original transmission node with little delay.

Normally, real-time applications also require feedback from the actuated subscribers. In this case, the Ethernet transmission link 2 is in the form of a full duplex transmission link with separate transmission and reception channels so that the Ethernet messages which are to be sent are not influenced by received messages containing the feedback. In this case, the volume of returned data must also not exceed the volume of data sent originally, since the latter are equivalent to the maximum transmission capacity.

The invention claimed is:

1. A method for transmitting data as Ethernet messages, in compliance with an Ethernet transmission protocol, on an Ethernet network having a baud rate, said method comprising the steps of:
   converting the data, during transmission, into a plurality of Ethernet messages;
   imposing a break time between transmission of each of the plurality of Ethernet messages;
   adjusting at least one transmission parameter to ensure that, at the baud rate and with the imposed break time, Ethernet messages are transmitted continuously during an entire cycle time of a cycle; and
   transmitting said plurality of Ethernet messages sequentially, cyclically, and continuously during one or more cycles.

2. The method according to claim 1, wherein the adjusting step comprises:
   determining a size of each of said plurality of Ethernet messages;
   adjusting the cycle time responsive to the size of each of said plurality of Ethernet messages; and
   limiting the cycle time to a maximum permissible duration.

3. The method according to claim 1, wherein the adjusting step comprises:
   determining a size of each of said plurality of Ethernet messages;
   adjusting the size of each of said plurality of Ethernet messages responsive to the cycle time; and
   limiting the size of each of said plurality of Ethernet messages to ensure continuous and complete transmission of each of said plurality of Ethernet messages during the cycle.

4. The method according to claim 3, wherein the step of adjusting the size of each of said plurality of Ethernet messages is further responsive to the baud rate of the Ethernet network, and wherein each of said plurality of Ethernet messages includes a start identifier, a preamble, a checksum, and a break time between transmissions.

5. The method according to claim 1, wherein the adjusting step comprises:
   determining a number of said plurality of Ethernet messages;
   adjusting the number of said plurality of Ethernet messages responsive to the cycle time; and
   limiting the number of said plurality of Ethernet messages to ensure continuous and complete transmission of said plurality of Ethernet messages during the cycle.

6. The method according to claim 5, wherein the step of adjusting the number of said plurality of Ethernet messages is further responsive to the baud rate of the Ethernet network, and wherein each of said plurality of Ethernet messages includes a start identifier, a preamble, a checksum, and a break time between transmissions.

7. The method according to claim 1, further comprising the step of calculating a maximum size of each of said plurality of Ethernet messages as an arithmetic difference between:
   a product of the baud rate of the Ethernet network and the cycle time; and
   an arithmetic total of a length of a start identifier, a length of a preamble, a length of a checksum, and a break time between transmissions.

8. The method according to claim 1, wherein the adjusting step comprises:
   aggregating said plurality of Ethernet messages into a transmission packet;
   calculating a size of the transmission packet as an arithmetic total of a size of each of said plurality of Ethernet messages comprising the transmission packet; and
   limiting the size of the transmission packet to a maximum permissible size.

9. The method according to claim 1, further comprising the steps of:
   aggregating said plurality of Ethernet messages into a transmission packet;
   storing the transmission packet in a buffer; and
   transmitting one or more transmission packets from the buffer after the buffer fills to a proscribed level.

10. The method according to claim 1, further comprising the steps of:
    assembling data into said plurality of Ethernet messages; and
    synchronistically transmitting said plurality of Ethernet messages.

11. A node for an Ethernet network, the node compliant with an Ethernet transmission protocol and comprising a control unit including:
    means for converting data into a plurality of Ethernet messages;
    means for adjusting at least one transmission parameter to ensure that Ethernet messages are transmitted continuously during an entire cycle time of a cycle; and
    means for transmitting said plurality of Ethernet messages sequentially, cyclically and continuously during one or more cycles with a prescribed break time between transmissions.

12. The node according to claim 11, wherein said means for transmitting said plurality of Ethernet messages comprises a transmission unit and the node further comprises means for controlling said transmission unit.

13. The node according to claim 11, wherein the means for adjusting comprises:
    means for determining a size of each of said plurality of Ethernet messages;
    means for adjusting the cycle time responsive to the size of each of said plurality of Ethernet messages; and
    means for limiting the cycle time to a maximum permissible duration.

14. The node according to claim 11, wherein the means for adjusting comprises:
    means for determining a size of each of said plurality of Ethernet messages;
    means for adjusting the size of each of said plurality of Ethernet messages responsive to the cycle time; and
    means for limiting the size of each of said plurality of Ethernet messages to ensure continuous and complete transmission of said plurality of Ethernet messages during the cycle.

15. The node according to claim 11, wherein the means for adjusting comprises:
    means for determining a number of said plurality of Ethernet messages;
    means for adjusting the number of said plurality of Ethernet messages; and
    means for limiting the number of said plurality of Ethernet messages responsive to a prescribed cycle time.

16. The node according to claim 11 further comprising means for determining a maximum permissible size of each of said plurality of Ethernet messages.

17. The node according to claim 11 further comprising:
means for aggregating said plurality of Ethernet messages into a transmission packet;
means for storing said transmission packet; and
means for transmitting one or more transmission packets.

18. The node according to claim 11 further comprising:
means for assembling data into said plurality of Ethernet messages; and
means for synchronistically transmitting said plurality of Ethernet messages.

19. An Ethernet network comprising:
an Ethernet transmission link;
a plurality of nodes connected to said Ethernet transmission link, each of said plurality of nodes having a control unit including:
means for converting data into a plurality of Ethernet messages;
means for adjusting at least one transmission parameter to ensure that Ethernet messages are transmitted continuously during an entire cycle time of a cycle; and
means for transmitting said plurality of Ethernet messages sequentially, cyclically and continuously during one or more cycles with a prescribed break time between transmissions; and
a transmission channel for transmitting the plurality of Ethernet messages without collision.

20. The Ethernet network of claim 19, wherein said Ethernet transmission link comprises a ring-shaped topological arrangement and wherein said plurality of Ethernet messages are transmitted from one node to a next node.

21. A method for transmitting data as Ethernet messages, in compliance with an Ethernet transmission protocol, on an Ethernet network having a baud rate, said method comprising the steps of:
converting the data, during transmission, into a plurality of Ethernet messages;
imposing a break time between transmission of each of the plurality of Ethernet messages;
calculating a maximum size of each of said plurality of Ethernet messages as an arithmetic difference between (a) a product of the baud rate of the Ethernet network and the cycle time and (b) an arithmetic total of a length of a start identifier, a length of a preamble, a length of a checksum, and the break time between transmissions; and
transmitting each of said plurality of Ethernet messages sequentially, cyclically, and continuously during a cycle having a cycle time.

* * * * *